US005543165A

United States Patent [19]
Hill

[11] Patent Number: 5,543,165
[45] Date of Patent: Aug. 6, 1996

[54] PROCESS OF MAKING A SOLUBLE TEA PRODUCT WITH CHAMPAGNE-LIKE PROPERTIES

[76] Inventor: Julie B. Hill, 135 Green Valley Dr., Greenville, S.C. 29609

[21] Appl. No.: 467,187

[22] Filed: Jun. 6, 1995

[51] Int. Cl.⁶ ................................................ A23F 3/00
[52] U.S. Cl. ........................ 426/435; 426/590; 426/597
[58] Field of Search ............................. 426/435, 597, 426/590

[56] References Cited

U.S. PATENT DOCUMENTS

| | | |
|---|---|---|
| 4,472,441 | 9/1984 | Clark et al. . |
| 4,946,701 | 8/1990 | Tsai et al. ............................ 426/597 |
| 5,089,279 | 2/1992 | van Rooijen . |
| 5,240,732 | 8/1993 | Ueda . |
| 5,250,317 | 10/1993 | Liu et al. . |

OTHER PUBLICATIONS

STN Abstract AN: 90–331778 WPIDS for JP 02238851 Sep. 21, 1990 Inventor: I. Makibe.
STN Abstract AN: 89–021610 WPIDS for KR 8801879. Sep. 27, 1988 Inventor: D. Madoba.
STN Abstract AN: 88–237959 WPIDS for JP 63169934A Jul. 13, 1988 Inventors: Toyo et al.

*Primary Examiner*—Anthony J. Weier
*Attorney, Agent, or Firm*—Hardaway Law Firm P A

[57] ABSTRACT

A process for the production of a soluble tea product with champagne-like properties capable of being reconstituted in hot, warm, or cold water, wherein a dilute tea extract obtained from the combination of Manchurian mushroom, green or black tea leaf, and sugar is concentrated and reconstituted in water. The processing steps according to this invention are generally applicable to the preparation of both hot and cold water soluble tea beverages from any tea leaf.

1 Claim, No Drawings

PROCESS OF MAKING A SOLUBLE TEA PRODUCT WITH CHAMPAGNE-LIKE PROPERTIES

BACKGROUND OF THE INVENTION

This invention relates generally to a novel mushroom-containing tea product and, in particular, to a process for making tea from a mixture of black or green tea, sugar, distilled water, and Manchurian mushrooms to create a water soluble product, for example, a hot, warm, or cold liquid or freeze-dried form which is capable of being reconstituted to a tea beverage having champagne-like properties. The champagne-like properties consist of champagne-like flavor, color, and effervescence. Manchurian mushrooms are native to the northernmost region of China and is one of various edible fungi of the class Basidiomycetes, characteristically having a flat cap.

The prior art includes various patents on processing tea or leaf based beverages. For example, U.S. Pat. No. 4,472,441 discloses a process of making a water soluble product, for example, an extract, concentrate or powder, from tea leaves which is capable of being reconstituted to a tea beverage substantially free of undesirable cloudiness and/or turbidity. U.S. Pat. No. 5,250,317 discloses a process for treating black tea leaves to result in aqueous beverage extracts having minimal turbidity in cold water. U.S. Pat. No. 5,240,732 relates to a novel plant extract containing beverage, and relates more directly to a beverage containing a flavonoid selected from the group consisting of ginko leaf extract, persimmon leaf extract, crataegus extract, Japanese pagoda extract and lycium fruit extract. U.S. Pat. No. 5,089,279 relates to a granular beverage material and a method for its preparation from a powdered extract of the beverage. The prior art is also believed to have produced beverages utilizing mushrooms.

While prior art processes function well for their intended purposes, room for improvement exists within the art of producing tea products.

OBJECT OF THE INVENTION

It is an object of the invention to provide a tea beverage having champagne-like properties.

It is a further object of the invention to provide a method for making an extract usable to make tea having champagne-like properties.

It is yet a further object of the invention to provide an improved tea beverage.

These and other objects of the invention are achieved by providing a concentrate comprising:

a predetermined amount of distilled water;

a predetermined amount of green or black tea;

a predetermined amount of sugar; and a predetermined amount of Manchurian mushrooms; and brewing said concentrate.

DETAILED DESCRIPTION OF THE INVENTION

The process of the present invention is described in further detail hereinafter with reference to the preparation of a hot, warm, or cold water reconstitutable shelf-stable powder from green or black tea combined with Manchurian mushrooms, distilled water, and sugar.

The processing of leaf tea to form a water soluble extract or concentrate, or freeze dried powder which will reconstitute to a tea beverage is, in its general aspects, well known in the art. Thus for example, green or black leaf tea is typically extracted with hot water to form a dilute extract containing soluble tea solids. The insoluble leaf material is discarded and the extract is then concentrated to form a concentrated extract which may be sold as is (for example, in frozen, refrigerated or otherwise preserved condition) or dried in an appropriate manner to form a shelf-stable powder.

Although it is not apparent how the champagne-like properties are produced, they are when the beverage is brewed. Brewing is done as follows:

(a) contacting green or black tea leaf with distilled water boiled in a stainless steel container to extract soluble solids from the green or black tea leaf;

(b) adding sugar to the boiling water and boiling further for five minutes;

(c) removing the distilled water, green or black tea leaf and sugar mixture from heat;

(d) steeping above mentioned mixture for 10 minutes;

(e) cooling tea in a glass container;

(f) adding some freshly harvested tea;

(g) placing a Manchurian mushroom (dark side down) on top of the liquid mixture;

(h) covering liquid mixture with clean white towel secured by a rubber band;

(i) placing mixture in a dark location at 70 to 90 degrees F. for seven to ten days until the pH is approximately 3.0.

(j) straining tea mixture through a cheese cloth.

The strained matter may be freeze dried loosely or pressed in cube form and stored. The tea is reconstituted by adding 1 tsp or cube per cup of boiling distilled water and steeping for 1 to 2 minutes.

Optionally, the beverage of the invention can contain, besides the above components, at least one of usual components contained in usual beverages such as, for example, so-called refreshing beverages, nutrition beverages, and healthy beverages (or functional beverages) and a beverage enticing the popular fancy. Examples of such usual beverage components are a sweetener (e.g. fructose glucose liquid sugar, sucrose etc. acting as a sweetener). The beverage of the invention is a nonalcoholic, or extremely low alcohol, beverage. The solvent in the beverage of the invention is distilled water.

The above description is given in reference to a tea drink having champagne-like properties. However, it is understood that many variations are apparent to one of ordinary skill in the art from reading the above specification and such variations are within the spirit and scope of the instant invention as defined by the following appended claims.

That which is claimed:

1. A process for producing a tea product having champagne-like properties, comprising:

boiling a predetermined amount of distilled water;

adding sugar to the boiling water to dissolve same;

adding tea to the distilled water and steeping same;

permitting said steeped tea to cool to ambient room temperature;

adding harvested tea to said distilled water having sugar and tea therein;

adding Manchurian Mushroom with the dark side down on top of said distilled water having sugar and tea therein;

covering said distilled water having sugar and tea therein;

placing the covered distilled water having sugar and tea therein in a dark location with an ambient temperature of 70°–90° Fahrenheit for seven to ten days until a pH of about 3.0 is reached;

straining liquid from said container to provide said tea product having champagne-like properties.

\* \* \* \* \*